United States Patent
Matas et al.

(10) Patent No.: US 10,430,039 B2
(45) Date of Patent: Oct. 1, 2019

(54) METHODS AND SYSTEMS FOR PROVIDING USER FEEDBACK

(71) Applicant: Facebook, Inc., Menlo Park, CA (US)

(72) Inventors: Michael James Matas, Healdsburg, CA (US); Benjamin S. Langholz, San Francisco, CA (US); Brian Daniel Amerige, Palo Alto, CA (US)

(73) Assignee: FACEBOOK, INC., Menlo Park, CA (US)

( * ) Notice: Subject to any disclaimer, the term of this patent is extended or adjusted under 35 U.S.C. 154(b) by 801 days.

(21) Appl. No.: 14/728,838

(22) Filed: Jun. 2, 2015

(65) Prior Publication Data

US 2016/0357352 A1 Dec. 8, 2016

(51) Int. Cl.
| | |
|---|---|
| *G06F 3/0484* | (2013.01) |
| *G06Q 50/00* | (2012.01) |
| *H04N 21/4788* | (2011.01) |
| *G06F 3/0488* | (2013.01) |
| *H04N 21/475* | (2011.01) |
| *H04N 21/658* | (2011.01) |

(52) U.S. Cl.
CPC ........ *G06F 3/0484* (2013.01); *G06F 3/04883* (2013.01); *G06Q 50/01* (2013.01); *H04N 21/475* (2013.01); *H04N 21/4788* (2013.01); *H04N 21/6582* (2013.01); *G06F 2203/04803* (2013.01)

(58) Field of Classification Search
CPC ... G06F 3/0484; G06Q 50/01; H04N 21/4788
See application file for complete search history.

(56) References Cited

U.S. PATENT DOCUMENTS 6,330,589 B1 * 12/2001 Kennedy .............. G06Q 10/107
707/999.104
8,332,477 B1 * 12/2012 Kaiserlian ............... H04L 51/16
709/206

(Continued)

OTHER PUBLICATIONS

Atwood, "Web Discussions: Flat by Design," Dec. 13, 2012, https://blog.codinghorror.com/web-discussions-flat-by-design/.*

(Continued)

*Primary Examiner* — Ryan Barrett
(74) *Attorney, Agent, or Firm* — Morgan, Lewis & Bockius LLP

(57) ABSTRACT

A first story is displayed at a client device. The first story includes a second story and an indication of a previous user interaction with the second story that resulted in creation of the first story. First and second user-feedback interfaces corresponding to the first story and second story, respectively, are concurrently displayed. The first and second user-feedback interfaces include affordances for providing user feedback regarding their respective stories. User feedback is received for the first story through the first user-feedback interface or for the second story through the second user-feedback interface. When the user feedback is received through the first user-feedback interface, notification is sent to a server to associate the user feedback with the first story, and when the user feedback is received through the second user-feedback interface, notification is sent to the server to associate the user feedback with the second story.

19 Claims, 13 Drawing Sheets

(56) References Cited

U.S. PATENT DOCUMENTS

| | | | | |
|---|---|---|---|---|
| 9,118,723 | B1* | 8/2015 | Su | H04L 67/22 |
| 2003/0160815 | A1* | 8/2003 | Muschetto | G06F 3/0481 |
| | | | | 715/733 |
| 2005/0114781 | A1* | 5/2005 | Brownholtz | G06F 3/0482 |
| | | | | 715/733 |
| 2007/0033250 | A1* | 2/2007 | Levin | H04L 29/06027 |
| | | | | 709/204 |
| 2007/0282956 | A1* | 12/2007 | Staats | G06Q 10/107 |
| | | | | 709/206 |
| 2009/0112991 | A1* | 4/2009 | Gandhi | G06Q 10/10 |
| | | | | 709/205 |
| 2009/0276732 | A1* | 11/2009 | Dervan | G06Q 10/107 |
| | | | | 715/853 |
| 2009/0319911 | A1* | 12/2009 | McCann | G06Q 10/107 |
| | | | | 715/752 |
| 2010/0088634 | A1* | 4/2010 | Tsuruta | G06F 3/0481 |
| | | | | 715/800 |
| 2011/0010641 | A1* | 1/2011 | Wolff | G06Q 10/107 |
| | | | | 715/753 |
| 2011/0028186 | A1* | 2/2011 | Lee | G06F 3/0486 |
| | | | | 455/566 |
| 2011/0083101 | A1* | 4/2011 | Sharon | G06F 21/6245 |
| | | | | 715/800 |
| 2011/0154223 | A1* | 6/2011 | Whitnah | G06Q 10/10 |
| | | | | 715/753 |
| 2012/0005224 | A1* | 1/2012 | Ahrens | G06Q 10/10 |
| | | | | 707/769 |
| 2012/0110474 | A1* | 5/2012 | Chen | G06Q 10/10 |
| | | | | 715/753 |
| 2014/0136968 | A1* | 5/2014 | Matas | G06F 17/211 |
| | | | | 715/269 |
| 2014/0137010 | A1* | 5/2014 | Matas | G06F 9/4443 |
| | | | | 715/764 |
| 2015/0263995 | A1* | 9/2015 | Mahood | H04L 51/04 |
| | | | | 715/753 |
| 2015/0319125 | A1* | 11/2015 | Cai | H04W 4/21 |
| | | | | 709/206 |
| 2016/0323395 | A1* | 11/2016 | Matas | H04L 67/22 |
| 2016/0330147 | A1* | 11/2016 | Antebi | H04L 51/046 |
| 2017/0139920 | A1* | 5/2017 | Ball | G06F 17/3053 |
| 2017/0142044 | A1* | 5/2017 | Ball | H04L 51/12 |

OTHER PUBLICATIONS

Manning, "Working with Outlook Conversation View: Let's Talk," Jun. 12, 2013, https://www.attorneyatwork.com/working-with-outlook-conversation-view/.*

Zoho Blog, "See 'Exactly' How Conversations Unfold With Zoho Mail," Aug. 11, 2011, https://www.zoho.com/general/blog/see-exactly-how-conversations-unfold-with-zoho-mail.html.*

Perez, "Twitter is Experimenting with a New Way to Retweet," Jun. 24, 2014, https://techcrunch.com/2014/06/24/twitter-is-experimenting-with-a-new-way-to-retweet/.*

Cabrera, "How-To: Disable Reshares or Comments for Posts in Google Plus," Feb. 6, 2014, https://web.archive.org/web/20140305102854/http://www.twelveskip.com/tutorials/google-plus/1201/disable-reshares-or-comments-for-posts-in-google-plus.*

Poland, "Facebook's Recommend Vs. Like Button," Feb. 3, 2013, https://web.archive.org/web/20130203013144/http://smallbusiness.chron.com/facebooks-recommend-vs-like-button-56709.html.*

Hollander, "How to Retweet with a Comment, aka Use the Life-Changing Feature Twitter Just Added," Apr. 7, 2015, https://www.bustle.com/articles/74648-how-to-retweet-with-a-comment-aka-use-the-life-changing-feature-twitter-just-added.*

Fitton, "How to Retweet the Right Way (With a Comment) on Twitter," Apr. 15, 2015, https://web.archive.org/web/20150418002440/https://blog.hubspot.conn/blog/tabid/6307/bid/27675/how-to-retweet-the-right-way-in-4-easy-steps.aspx.*

Design for Different Screen Sizes Android, Oct. 6, 2014, http://stackoverflow.com/questions/21787476/design-for-different-screen-sizes-andriod, 3 pgs.

Android UI Design: Supporting Multiple Screens, Jun. 27, 2013, http://developer.android.com/guide/practices/screens_support.html, 3 pgs.

Effective Design for Multiple Screen Sizes, mobiForge, Mar. 19, 2013, http://mobiforge.com/designing/story/effective-design-multiple-s . . . , 12 pgs.

Design guidelines for mobile applications, Erik G. Nilsson, SINTEF ICT, Jun. 2008, 73 pgs.

Supporting Multiple Screens, Android UI Design: Stackoverflow, edited on Jun. 27, 2013, 3 pgs., downloaded from http://stackoverflow.com/questions/17345115/android-ui-design-supporting-multiple-screens, 24 pgs.

Adaptive User Interfaces, Mar. 15, 2015, downloaded from https://developer.apple.com/design/adaptivity, 1 pg.

About Designing for Multiple Size Classes, Size Classes Design Help, updated Oct. 16, 2014, 2 pgs., downloaded from https://developer.apple.com/library/ios/recipes/xcode_help-IB_adaptive_sizez/chapters/AboutAdaptiveSizeDesign.html, 2 pgs.

Overcoming the iPad Tax with iOS 8 and Adaptive UI, Carlson, Ryan, Aug. 1, 2014, 6 pgs., downloaded from http://blog.nerdery.com/2014/08/overcoming-ipad-tax-ios-8-adaptive-ui, 4 pgs.

How to create a responsive web design that adjusts to different screen sizes, Warner, Janine, Digital Family, Apr. 11, 2013, 5 pgs., downloaded from http://www.digitalfamily.com/tutorials/how-to-create-responsive-adaptive-web-sites, 4 pgs.

* cited by examiner

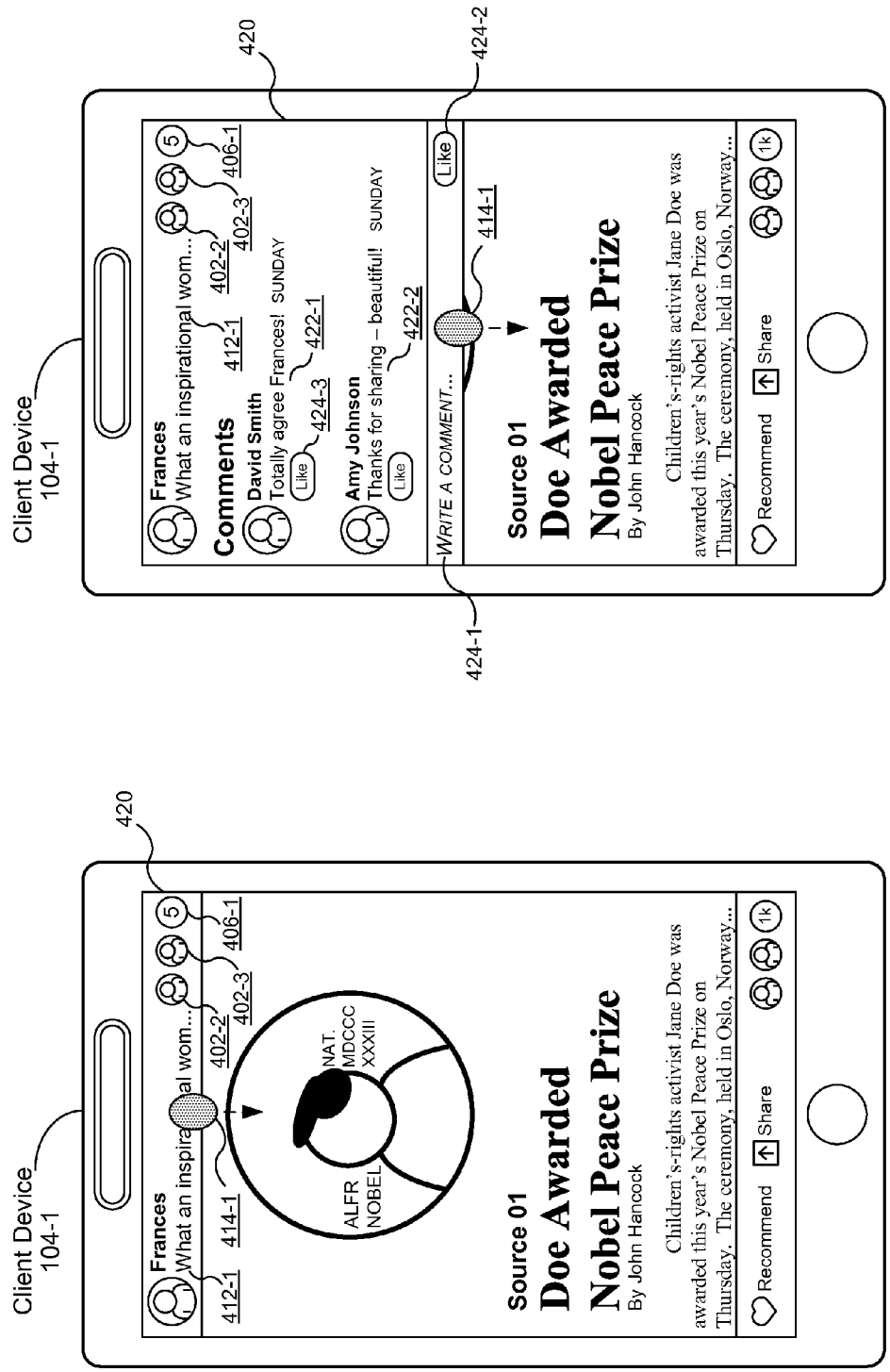

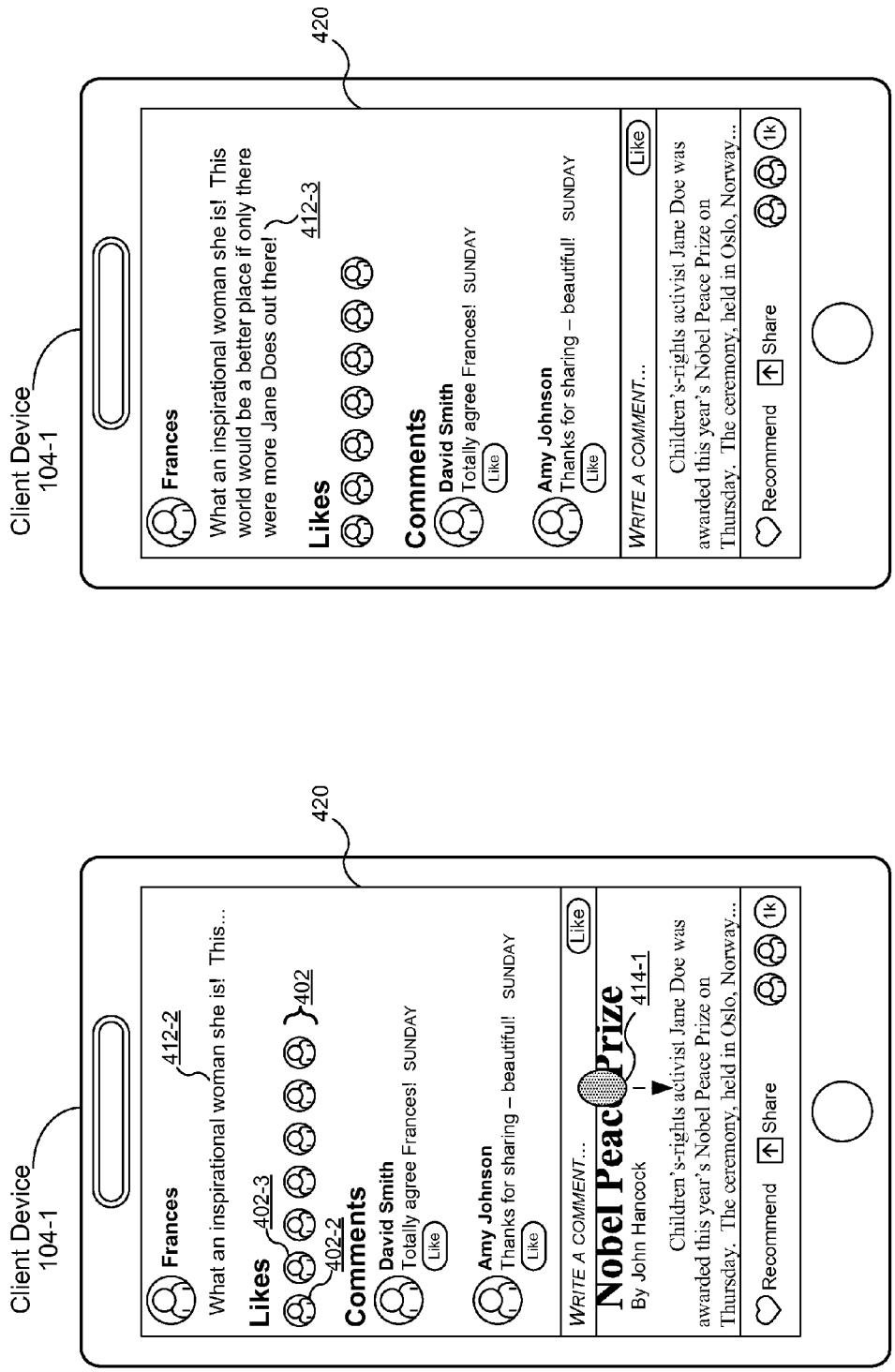

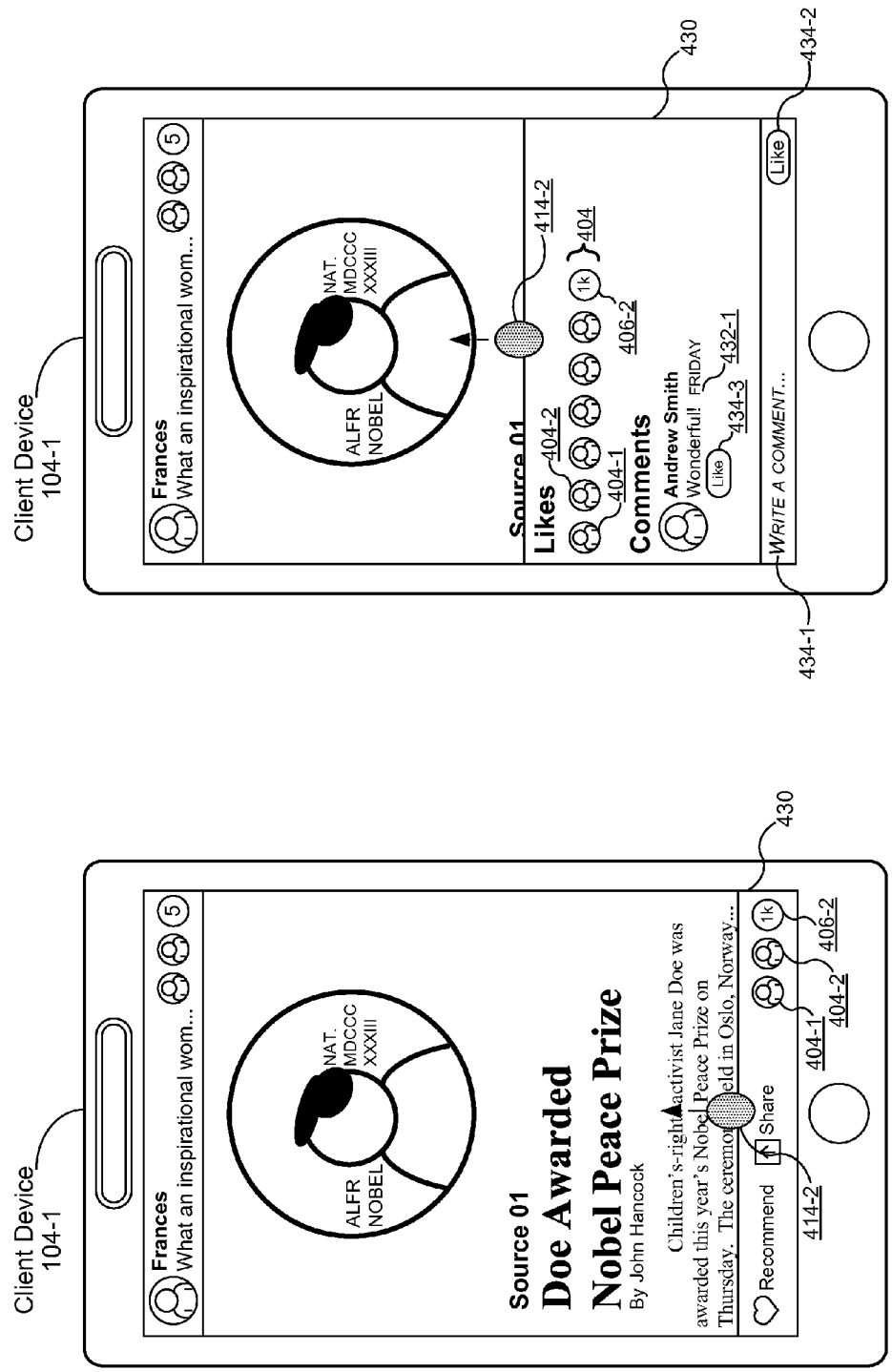

530

| 502 | Display a first story. The first story includes a second story and an indication of a previous user interaction with the second story that resulted in creation of the first story. |

| 508 | Concurrently display a first user-feedback interface (UFI) corresponding to the first story and a second user-feedback interface corresponding to the second story. |
| 532 | Display compressed views of the first and/or second user-feedback interfaces |
| 534 | The compressed view of the 1st UFI includes a portion of user feedback for the second story provided by a first user in the previous user interaction that resulted in creation of the first story |
| 536 | The compressed view of the 1st UFI includes user feedback of a first set of users, not including the first user, for the first story |
| 538 | The compressed view of the 1st UFI includes the one or more first affordances |
| 540 | The compressed view of the 1st UFI shows a first type of user feedback |
| 542 | The compressed view of the 2nd UFI includes user feedback of a first set of users for the second story |
| 544 | The compressed view of the 2nd UFI includes the one or more second affordances |
| 546 | The compressed view of the 2nd UFI shows a first type of user feedback |

| 548 | Detect selection of the first or second user-feedback interface |
| 550 | Detect a continuous swipe gesture beginning on the first or second user-feedback interface |

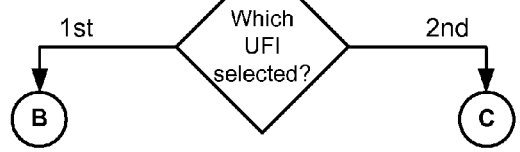

Which UFI selected?
1st → B
2nd → C

FIGURE 5C

METHODS AND SYSTEMS FOR PROVIDING USER FEEDBACK

TECHNICAL FIELD

This relates generally to providing user feedback, including but not limited to concurrently displaying user-feedback interfaces for providing user feedback on electronic content.

BACKGROUND

The Internet has become an increasingly dominant platform for the publication of electronic content, for both the media and the general population. At the same time, enabling users to interact with such published electronic content has become an increasingly important feature for online services, such as social networks, to implement.

Given the abundance of published electronic content, users often struggle to provide user feedback in an efficient manner.

SUMMARY

Accordingly, there is a need for methods, systems, and interfaces for providing user feedback on electronic content in a simple and efficient manner By concurrently displaying multiple user-feedback interfaces corresponding to multiple stories, such as news articles and user republications of news articles, users can efficiently and easily provided feedback for the stories. Such methods and interfaces optionally complement or replace conventional methods for providing user feedback.

In accordance with some embodiments, a method is performed at a client device with one or more processors and memory storing instructions for execution by the one or more processors. The method includes displaying a first story, wherein the first story includes a second story and an indication of a previous user interaction with the second story that resulted in creation of the first story. A first user-feedback interface corresponding to the first story and a second user-feedback interface corresponding to the second story are concurrently displayed. The first user-feedback interface comprises one or more first affordances for providing user feedback regarding the first story and the second user-feedback interface comprises one or more second affordances for providing user feedback regarding the second story. The method includes receiving user feedback for the first story through the first user-feedback interface or for the second story through the second user-feedback interface. When the user feedback is received through the first user-feedback interface, notification is sent to a server to associate the user feedback with the first story. When the user feedback is received through the second user-feedback interface, notification is sent to the server to associate the user feedback with the second story.

In accordance with some embodiments, a client device includes one or more processors, memory, and one or more programs; the one or more programs are stored in the memory and configured to be executed by the one or more processors. The one or more programs include instructions for performing the operations of the method described above. In accordance with some embodiments, a non-transitory computer-readable storage medium has stored therein instructions that, when executed by the electronic device, cause the electronic device to perform the operations of the method described above.

Thus, client devices are provided with more effective and efficient methods for providing user feedback for stories, thereby increasing the effectiveness and efficiency of such devices and user satisfaction with such devices.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

FIGS. 4A-4H illustrate exemplary graphical user interfaces (GUIs) on a client device for providing user feedback, in accordance with some embodiments.

FIGS. 5A-5E are flow diagrams illustrating a method of providing user feedback in accordance with some embodiments.

DESCRIPTION OF EMBODIMENTS

Figure 1:
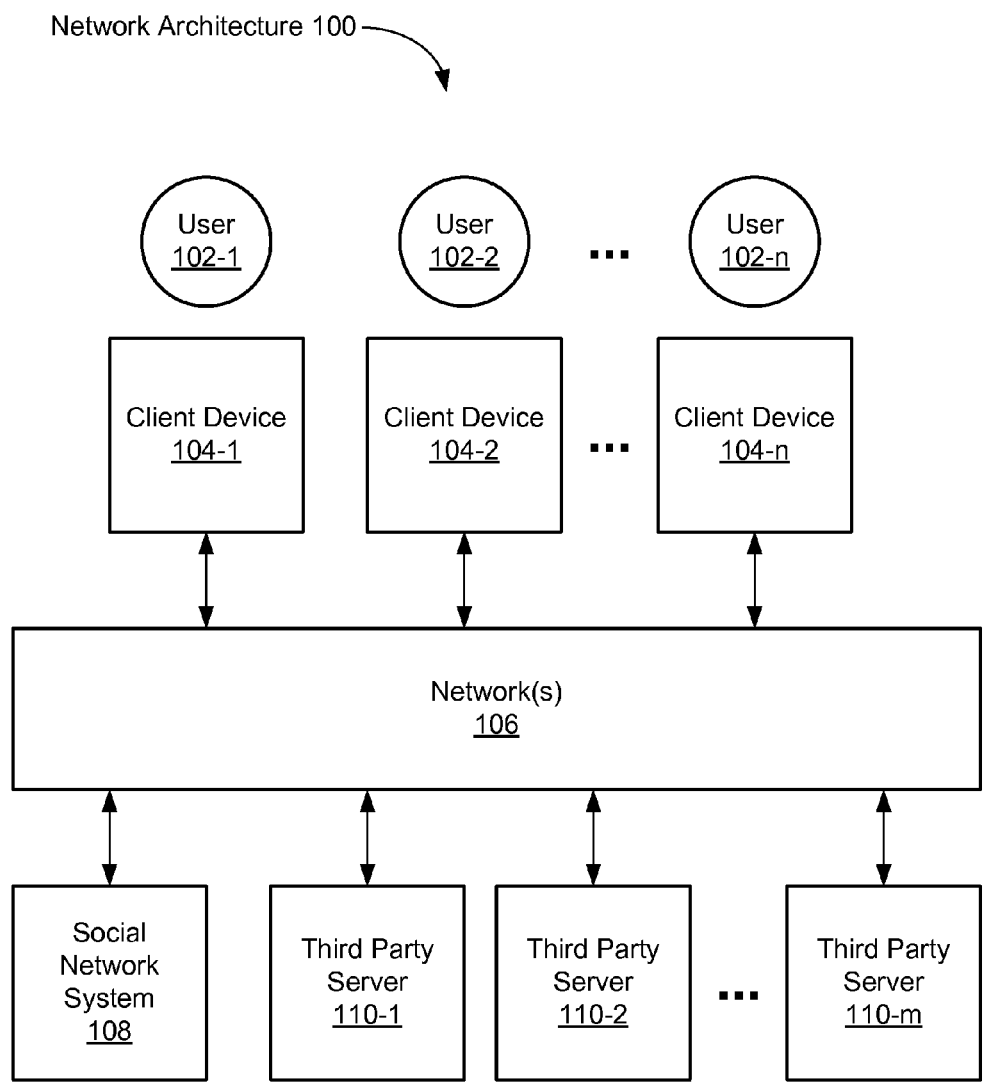
FIG. 1 is a block diagram illustrating an exemplary network architecture of a social network in accordance with some embodiments.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first user-feedback interface could be termed a second user-feedback interface, and, similarly, a second user-feedback interface could be termed a first user-feedback interface, without departing from the scope of the various described embodiments. The first user-feedback interface and the second user-feedback interface are both user-feedback interfaces, but they are not the same user-feedback interface.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

FIG. 1 is a block diagram illustrating an exemplary network architecture 100 of a social network in accordance with some embodiments. The network architecture 100 includes a number of client devices (also called "client systems," "client computers," or "clients") 104-1, 104-2, . . . 104-n communicably connected to an electronic social-network system 108 by one or more networks 106 (e.g., the Internet, cellular telephone networks, mobile data networks, other wide area networks, local area networks, metropolitan area networks, and so on). In some embodiments, the one or more networks 106 include a public communication network (e.g., the Internet and/or a cellular data network), a private communications network (e.g., a private LAN or leased lines), or a combination of such communication networks.

In some embodiments, the client devices 104-1, 104-2, . . . 104-n are computing devices such as smart watches, personal digital assistants, portable media players, smart phones, tablet computers, 2D gaming devices, 3D (e.g., virtual reality) gaming devices, laptop computers, desktop computers, televisions with one or more processors embedded therein or coupled thereto, in-vehicle information systems (e.g., an in-car computer system that provides navigation, entertainment, and/or other information), and/or other appropriate computing devices that can be used to communicate with the social-network system 108. In some embodiments, the social-network system 108 is a single computing device such as a computer server, while in other embodiments, the social-network system 108 is implemented by multiple computing devices working together to perform the actions of a server system (e.g., cloud computing).

Users 102-1, 102-2, . . . 102-n employ the client devices 104-1, 104-2, . . . 104-n to access the social-network system 108 and to participate in a corresponding social-networking service provided by the social-network system 108. For example, one or more of the client devices 104-1, 104-2, . . . 104-n execute web browser applications that can be used to access the social-networking service. As another example, one or more of the client devices 104-1, 104-2, . . . 104-n execute software applications that are specific to the social-networking service (e.g., social-networking "apps" running on smart phones or tablets, such as a Facebook social-networking application running on an iPhone, Android, or Windows smart phone or tablet).

Users interacting with the client devices 104-1, 104-2, . . . 104-n can participate in the social-networking service provided by the social-network system 108 by providing and/or consuming (e.g., posting, writing, viewing, publishing, broadcasting, promoting, recommending, sharing, commenting on, liking) digital content, such as text comments (e.g., statuses, updates, announcements, replies, location "check-ins," private/group messages), photos, videos, audio files, links (e.g., to web pages, articles, etc.), documents, and/or other electronic content. Users of the social-networking service can also annotate information posted by other users of the social-networking service (e.g., endorsing or "liking" a posting of another user, or commenting on a post by another user or publishing source). In some embodiments, information can be posted on a user's behalf by systems and/or services external to the social-network system 108. For example, the user may post a review of a movie to a movie-review website, and with proper permissions that website may cross-post the review to the social network system 108 on the user's behalf. In another example, a software application executing on a mobile client device, with proper permissions, may use global positioning system (GPS) or other geo-location capabilities (e.g., Wi-Fi or hybrid positioning systems) to determine the user's location and update the social network system 108 with the user's location (e.g., "At Home", "At Work", or "In San Francisco, Calif."), and/or update the social network system 108 with information derived from and/or based on the user's location. Users interacting with the client devices 104-1, 104-2, . . . 104-n can also use the social-networking service provided by the social-network system 108 to define groups of users. Users interacting with the client devices 104-1, 104-2, . . . 104-n can also use the social-networking service provided by the social-network system 108 to communicate and collaborate with each other.

In some embodiments, the network architecture 100 also includes third-party servers 110-1, 110-2, . . . 110-m. In some embodiments, a given third-party server 110 is used to host third-party websites that provide web pages to client devices 104, either directly or in conjunction with the social-network system 108. In some embodiments, the social-network system 108 uses inline frames ("iframes") to nest independent websites within a user's social network session. In some embodiments, a given third-party server is used to host third-party applications that are used by client devices 104, either directly or in conjunction with the social-network system 108. In some embodiments, the social-network system 108 uses iframes to enable third-party developers to create applications that are hosted separately by a third-party server 110, but operate within a social-networking session of a user 102 and are accessed through the user's profile in the social-network system 108. Exemplary third-party applications include applications for books, business, communication, contests, education, entertainment, fashion, finance, food and drink, games, health and fitness, lifestyle, local information, movies, television, music and audio, news, photos, video, productivity, reference material, security, shopping, sports, travel, utilities, and the like. In some embodiments, a given third-party server 110 is used to host enterprise systems, which are used by client devices 104, either directly or in conjunction with the social-network system 108. In some embodiments, a given third-party server 110 is used to provide third-party content (e.g., news articles, reviews, message feeds, etc.).

In some embodiments, a given third-party server 110 is a single computing device, while in other embodiments, a given third-party server 110 is implemented by multiple computing devices working together to perform the actions of a server system (e.g., cloud computing).

Figure 2:
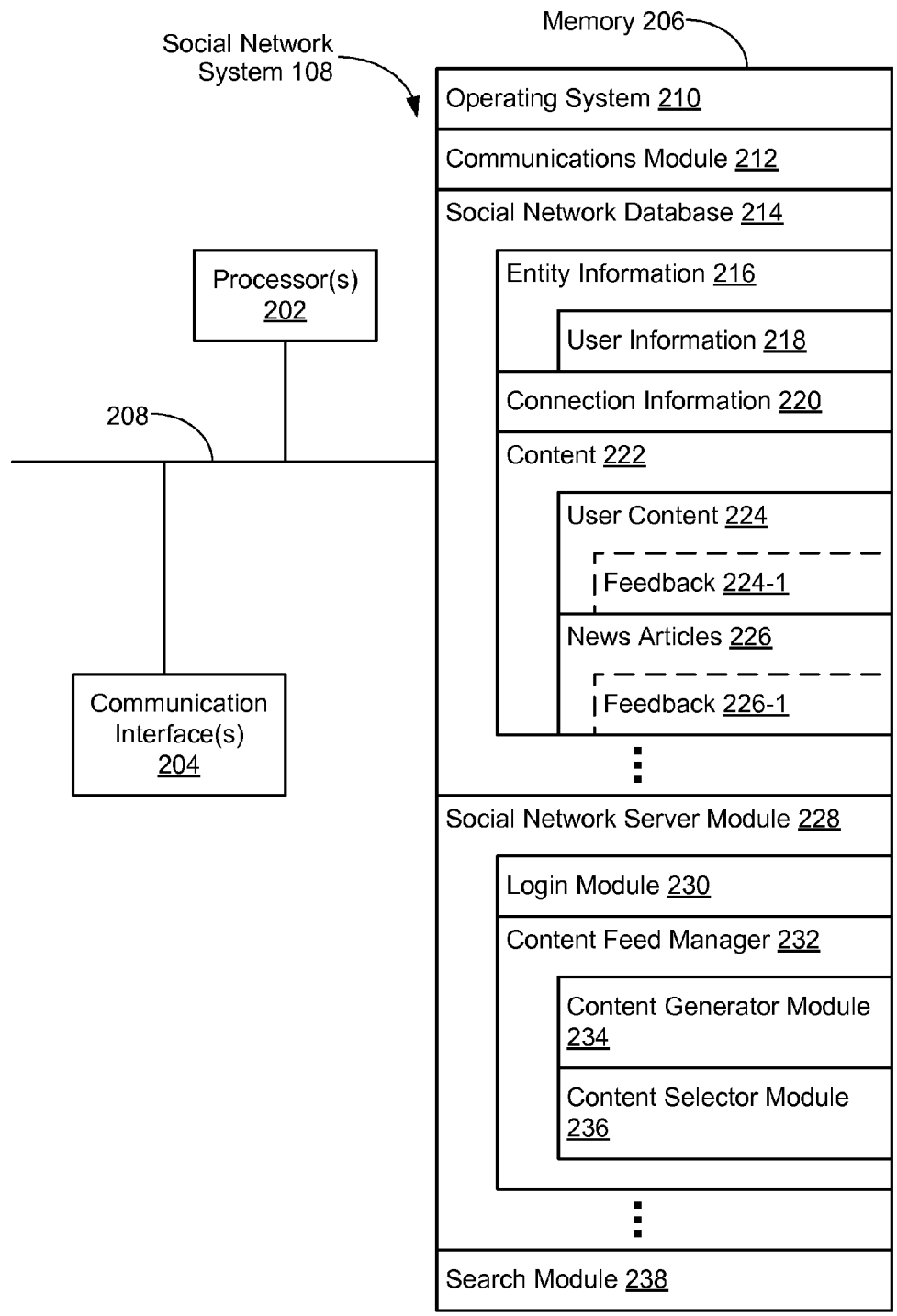
FIG. 2 is a block diagram illustrating an exemplary social-network system in accordance with some embodiments.

FIG. 2 is a block diagram illustrating an exemplary social-network system 108 in accordance with some embodiments. The social-network system 108 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The social-network system 108 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Figure 3:
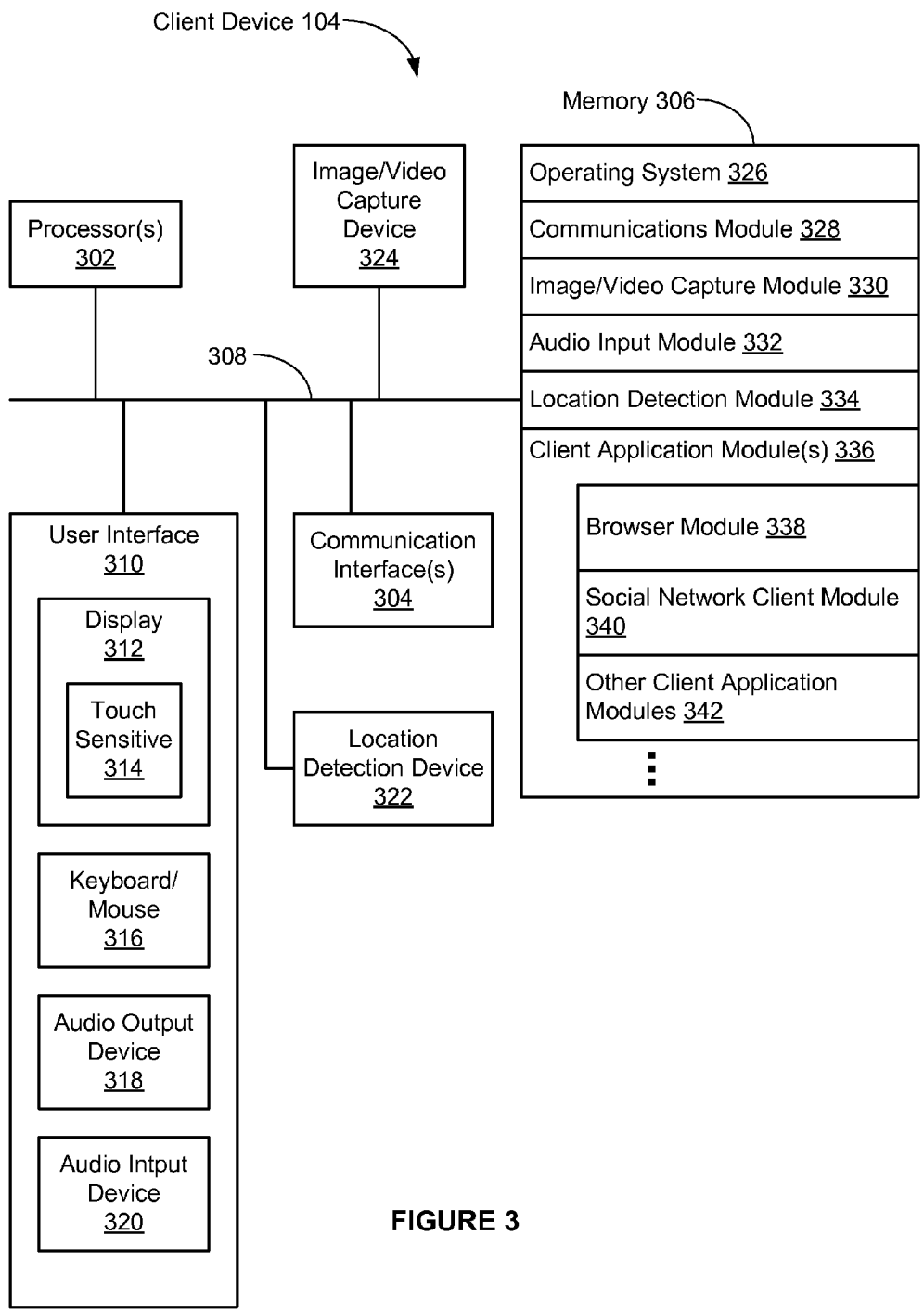
FIG. 3 is a block diagram illustrating an exemplary client device in accordance with some embodiments.

Memory 206 includes high-speed random-access memory, such as DRAM, SRAM, DDR RAM, or other random-access solid-state memory devices; and may include non-volatile memory, such as one or more magnetic disk storage devices, optical disk storage devices, flash memory devices, and/or other non-volatile solid-state storage devices. Memory 206 may optionally include one or more storage devices remotely located from the processor(s) 202. Memory 206, or alternately the non-volatile memory device(s) within memory 206, includes a non-transitory computer-readable storage medium. In some embodiments, memory 206 or the computer-readable storage medium of memory 206 stores the following programs, modules and data structures, or a subset or superset thereof:

- an operating system 210 that includes procedures for handling various basic system services and for performing hardware dependent tasks;
- a network communication module 212 that is used for connecting the social-network system 108 to other computers via the one or more communication network interfaces 204 (wired or wireless) and one or more communication networks (e.g., the one or more networks 106);
- a social network database 214 for storing data associated with the social network, such as:
    - entity information 216, such as user information 218;
    - connection information 220; and
    - content 222, such as:
        - user content 224, which includes user feedback 224-1; and/or
        - news articles 226, which includes user feedback;
- a social network server module 228 for providing social-networking services and related features (e.g., in conjunction with browser module 338 or social network client module 340 on the client device 104, FIG. 3), which includes:
    - a login module 230 for logging a user 102 at a client 104 into the social-network system 108; and
    - a content feed manager 232 for providing content to be sent to clients 104 for display, which includes:
        - a content generator module 234 for adding objects to the social network database 214, such as images, videos, audio files, comments, status messages, links, applications, and/or other entity information 216, connection information 220, or content 222; and
        - a content selector module 236 for choosing the information/content to be sent to clients 104 for display; and
    - a search module 238 for enabling users of the social-network system to search for content and other users in the social network.

The social network database 214 stores data associated with the social network in one or more types of databases, such as graph, dimensional, flat, hierarchical, network, object-oriented, relational, and/or XML databases.

In some embodiments, the social network database 214 includes a graph database, with entity information 216 represented as nodes in the graph database and connection information 220 represented as edges in the graph database. The graph database includes a plurality of nodes, as well as a plurality of edges that define connections between corresponding nodes. In some embodiments, the nodes and/or edges themselves are data objects that include the identifiers, attributes, and information for their corresponding entities, some of which are rendered at clients 104 on corresponding profile pages or other pages in the social-networking service. In some embodiments, the nodes also include pointers or references to other objects, data structures, or resources for use in rendering content in conjunction with the rendering of the pages corresponding to the respective nodes at clients 104.

Entity information 216 includes user information 218, such as user profiles, login information, privacy and other preferences, biographical data, and the like. In some embodiments, for a given user, the user information 218 includes the user's name, profile picture, contact information, birth date, sex, marital status, family status, employment, education background, preferences, interests, and/or other demographic information.

In some embodiments, entity information 216 includes information about a physical location (e.g., a restaurant, theater, landmark, city, state, or country), real or intellectual property (e.g., a sculpture, painting, movie, game, song, idea/concept, photograph, or written work), a business, a group of people, and/or a group of businesses. In some embodiments, entity information 216 includes information about a resource, such as an audio file, a video file, a digital photo, a text file, a structured document (e.g., web page), or an application. In some embodiments, the resource is located in the social-network system 108 (e.g., in content 222) or on an external server, such as third-party server 110.

In some embodiments, connection information 220 includes information about the relationships between entities in the social network database 214. In some embodiments, connection information 220 includes information about edges that connect pairs of nodes in a graph database. In some embodiments, an edge connecting a pair of nodes represents a relationship between the pair of nodes.

In some embodiments, an edge includes or represents one or more data objects or attributes that correspond to the relationship between a pair of nodes. For example, when a first user indicates that a second user is a "friend" of the first user, the social-network system 108 transmits a "friend request" to the second user. If the second user confirms the "friend request," the social-network system 108 creates and stores an edge connecting the first user's user node and the second user's user node in a graph database as connection information 220 that indicates that the first user and the second user are friends. In some embodiments, connection information 220 represents a friendship, a family relationship, a business or employment relationship, a fan relationship, a follower relationship, a visitor relationship, a subscriber relationship, a superior/subordinate relationship, a reciprocal relationship, a non-reciprocal relationship, another suitable type of relationship, or two or more such relationships.

In some embodiments, an edge between a user node and another entity node represents connection information about a particular action or activity performed by a user of the user node towards the other entity node. For example, a user may "like" or have "attended," "played," "listened," "cooked," "worked at," or "watched" the entity at the other node. The page in the social-networking service that corresponds to the entity at the other node may include, for example, a selectable "like," "check in," or "add to favorites" icon. After the user clicks one of these icons, the social-network system 108 may create a "like" edge, "check in" edge, or a "favorites" edge in response to the corresponding user action. As another example, the user may listen to a particular song using a particular application (e.g., an online music application). In this case, the social-network system 108 may create a "listened" edge and a "used" edge between the user node that corresponds to the user and the entity nodes that correspond to the song and the application, respectively, to indicate that the user listened to the song and used the application. In addition, the social-network system 108 may create a "played" edge between the entity nodes that correspond to the song and the application to indicate that the particular song was played by the particular application.

In some embodiments, content 222 includes text (e.g., ASCII, SGML, HTML), images (e.g., jpeg, tif and gif), graphics (e.g., vector-based or bitmap), audio, video (e.g., mpeg), other multimedia, and/or combinations thereof. In some embodiments, content 222 includes executable code (e.g., games executable within a browser window or frame), podcasts, links, and the like.

In some embodiments, the social network server module 228 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

FIG. 3 is a block diagram illustrating an exemplary client device 104 in accordance with some embodiments. The client device 104 typically includes one or more processing units (processors or cores) 302, one or more network or other communications interfaces 304, memory 306, and one or more communication buses 308 for interconnecting these components. The communication buses 308 optionally include circuitry (sometimes called a chipset) that interconnects and controls communications between system components. The client device 104 includes a user interface 310. The user interface 310 typically includes a display device 312. In some embodiments, the client device 104 includes inputs such as a keyboard, mouse, and/or other input buttons 316. Alternatively or in addition, in some embodiments, the display device 312 includes a touch-sensitive surface 314, in which case the display device 312 is a touch-sensitive display. In some embodiments, the touch-sensitive surface 314 is configured to detect various swipe gestures (e.g., continuous gestures in vertical and/or horizontal directions) and/or other gestures (e.g., single/double tap). In client devices that have a touch-sensitive display 312, a physical keyboard is optional (e.g., a soft keyboard may be displayed when keyboard entry is needed). The user interface 310 also includes an audio output device 318, such as speakers or an audio output connection connected to speakers, earphones, or headphones. Furthermore, some client devices 104 use a microphone and voice recognition to supplement or replace the keyboard. Optionally, the client device 104 includes an audio input device 320 (e.g., a microphone) to capture audio (e.g., speech from a user). Optionally, the client device 104 includes a location detection device 322, such as a GPS (global positioning satellite) or other geo-location receiver, for determining the location of the client device 104. The client device 104 also optionally includes an image/video capture device 324, such as a camera or webcam.

Memory 306 includes high-speed random-access memory, such as DRAM, SRAM, DDR RAM or other random-access solid-state memory devices; and may include non-volatile memory, such as one or more magnetic disk storage devices, optical disk storage devices, flash memory devices, or other non-volatile solid-state storage devices. Memory 306 may optionally include one or more storage devices remotely located from the processor(s) 302. Memory 306, or alternately the non-volatile memory device(s) within memory 306, includes a non-transitory computer-readable storage medium. In some embodiments, memory 306 or the computer-readable storage medium of memory 306 stores the following programs, modules and data structures, or a subset or superset thereof:

- an operating system 326 that includes procedures for handling various basic system services and for performing hardware dependent tasks;
- a network communication module 328 that is used for connecting the client device 104 to other computers via the one or more communication network interfaces 304 (wired or wireless) and one or more communication networks, such as the Internet, cellular telephone networks, mobile data networks, other wide area networks, local area networks, metropolitan area networks, and so on;
- an image/video capture module 330 (e.g., a camera module) for processing a respective image or video captured by the image/video capture device 324, where the respective image or video may be sent or streamed (e.g., by a client application module 336) to the social-network system 108;
- an audio input module 332 (e.g., a microphone module) for processing audio captured by the audio input device 320, where the respective audio may be sent or streamed (e.g., by a client application module 336) to the social-network system 108;
- a location detection module 334 (e.g., a GPS, Wi-Fi, or hybrid positioning module) for determining the location of the client device 104 (e.g., using the location detection device 322) and providing this location information for use in various applications (e.g., social network client module 340); and
- one or more client application modules 336, including the following modules (or sets of instructions), or a subset or superset thereof:
    - a web browser module 338 (e.g., Internet Explorer by Microsoft, Firefox by Mozilla, Safari by Apple, or Chrome by Google) for accessing, viewing, and interacting with web sites (e.g., a social-networking web site provided by the social-network system 108, and/or web sites that are linked to in a social network module 340 and/or an optional client application module 342), such as accessing a web site hosting a service for displaying and accessing content (e.g., stories, such as news articles, posts, etc. as shown in FIGS. 4A-4H);
    - a social network module 340 for providing an interface to a social-networking service (e.g., a social-networking service provided by social-network system 108) and related features, such as an interface to a service for displaying and accessing content (e.g., stories, such as news articles, posts, etc. as shown in FIGS. 4A-4H); and/or optional client application modules 342, such as applications for displaying and accessing content (e.g., stories, such as news articles, posts, etc. as shown in FIGS. 4A-4H), word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Each of the above identified modules and applications correspond to a set of executable instructions for performing one or more functions as described above and/or in the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 206 and/or 306 store a subset of the modules and data structures identified above. Furthermore, memory 206 and/or 306 optionally store additional modules and data structures not described above.

Attention is now directed towards embodiments of graphical user interfaces ("GUIs") and associated processes that may be implemented on a client device (e.g., the client device 104 in FIG. 3).

FIGS. 4A-4H illustrate exemplary GUIs on a client device 104 for providing user feedback, in accordance with some embodiments. The GUIs in these figures are used to illustrate the processes described below, including the methods 500 (FIGS. 5A-5B) and 530 (FIGS. 5C-5E). While FIGS. 4A-4H illustrate examples of GUIs, in other embodiments, one or more GUIs displays user-interface elements in arrangements distinct from the embodiments of FIGS. 4A-4H.

The GUIs shown in FIGS. 4A-4H may be provided by a web browser (e.g., browser module 338, FIG. 3), an application for a social-networking service (e.g., social network module 340), and/or a third-party application (e.g., client application module 342).

Figure 4A:
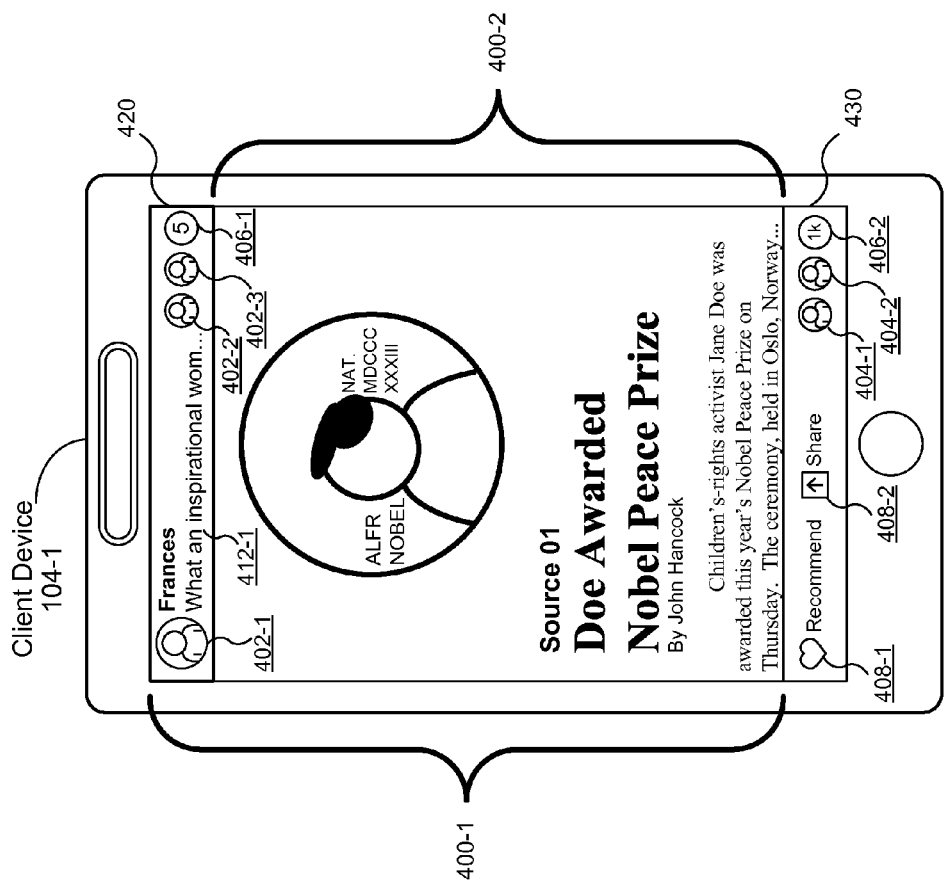
Figure 5A:
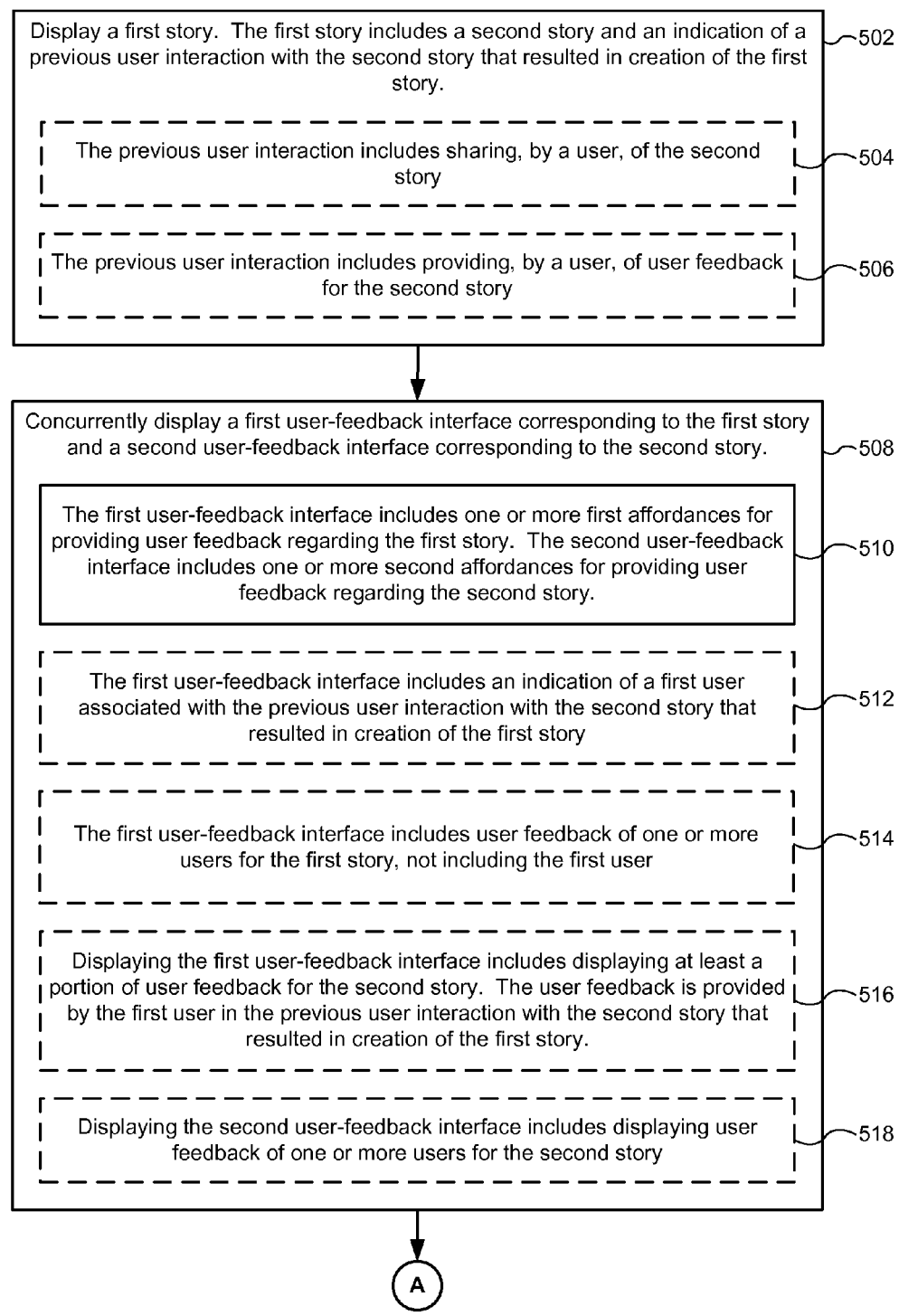

FIG. 4A illustrates a GUI for displaying a first story 400-1 and a second story 400-2. Stories include electronic content that can be presented and displayed on a device, such as text comments (e.g., news articles, blog posts, documents) and/or multimedia (e.g., digital photos, videos, audio files). Stories may include web pages, or content published by users of a social network (e.g., wall posts, status updates, check-ins, comments) or by other publication sources (e.g., news agencies, blogs). In some embodiments, stories are created by a user's interaction with other stories, such as a user providing feedback (e.g., a comment, "like," etc.) for a news article through a social-networking service. For example, the first story 400-1 in FIG. 4A includes the second story 400-2 (a news article) and an indication of a previous user interaction with the second story 400-2 that resulted in creation of the first story 400-1 (e.g., user 402-1 provides comment 412-1, which is a portion of comment 412-3, FIG. 4E).

The GUI in FIG. 4A also concurrently displays multiple user-feedback interfaces (UFIs) (e.g., a first UFI 420 and a second UFI 430). A user-feedback interface provides an interface through which user feedback for a respective story is received. In this example, the first UFI 420 receives user feedback for the first story 400-1, and the second UFI 430 receives user feedback for the second story 400-2. In some embodiments, user-feedback interfaces include one or more affordances for providing user feedback (e.g., a recommendation affordance 408-1 and a share affordance 408-2 of the second UFI 430). In some embodiments, user-feedback interfaces display user feedback for a respective story (e.g., a comment, "likes"). For example, the first UFI 420 displays a comment 412-1 (which is a portion of the comment 412-3, FIG. 4E) for the second story 400-2 provided by user 402-1, which resulted in the creation of the first story 400-1. The first UFI 420 and the second UFI 430 also display users who have "liked" the respective stories (e.g., users 402-2 and 402-3 "liked" the first story 400-1, and users 404-1 and 404-2 "liked" the second story 400-2), and also display indicators (e.g., 406-1, 406-2) which indicate the number of users who have "liked" the respective stories (e.g., excluding those already displayed by the UFIs).

Figure 4H:
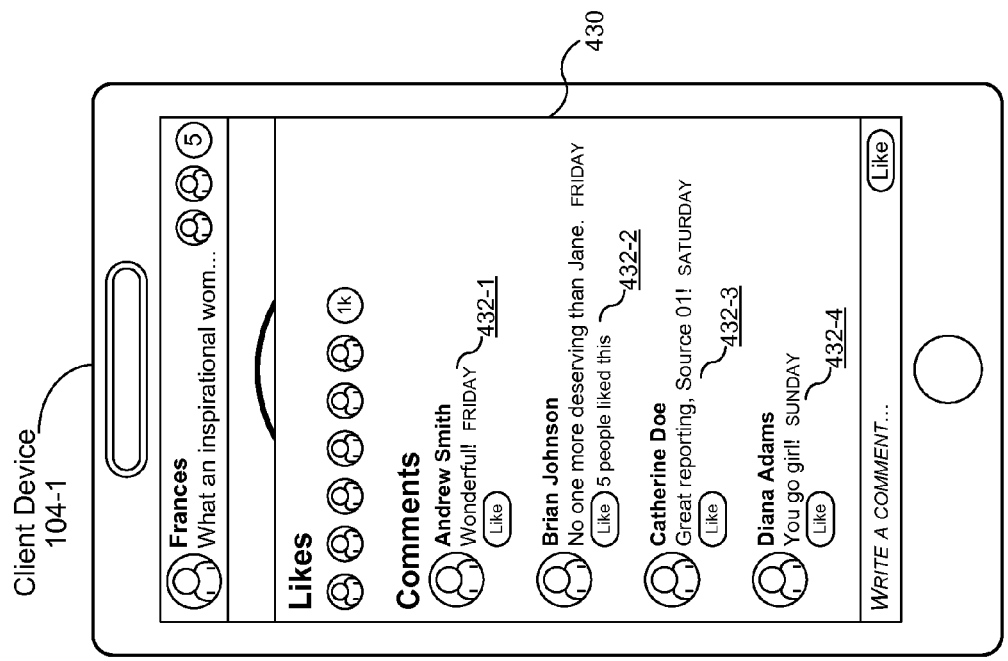

User-feedback interfaces may be displayed in a compressed view (e.g., the first UFI 420 and the second UFI 430 as shown in FIG. 4A). Additionally and/or alternatively, user-feedback interfaces may be displayed in expanded views, such as a partially expanded view (e.g., the first UFI 420 as shown in FIGS. 4C and 4D, and the second UFI 430 as shown in FIG. 4G) or a fully expanded view (e.g., the first UFI 420 as shown in FIG. 4E, and the second UFI 430 as shown in FIG. 4H). As shown by the examples of FIGS. 4B-4H, expanded views of a UFI may include additional or alternative user feedback and/or affordances that are not displayed by the compressed view (or another partially/fully expanded view). Expanded views of a UFI may also display increased portions of user feedback that are only partially displayed by the compressed view (e.g., displaying an entire comment in the expanded view, while displaying only a portion of the comment in the compressed view).

In this example, a downward swipe gesture 414-1 detected in FIG. 4B beginning in the first UFI 420 results in switching from displaying a compressed view of the first UFI 420 (FIG. 4B) to displaying a partially expanded view of the first UFI 420 (FIG. 4C). As shown, the partially expanded view in FIG. 4C displays user feedback that was displayed by the compressed view in FIG. 4B (e.g., "likes" by users 402-2 and 402-3, comment 412-1), and also displays user feedback that was not displayed by the compressed view (e.g., comments 422-1 and 422-2). Furthermore, the partially expanded view in FIG. 4C also includes affordances that were not displayed by the compressed view (e.g., comment affordance 424-1 and "like" affordance 424-2), and additional affordances for providing feedback for displayed user feedback (e.g., "like" affordances 424-3 for "liking" the comment 422-1 for the first story 400-1).

FIG. 4D illustrates another partially expanded view of the first UFI 420. In this example, the detection of the same swipe gesture 414-1 initiated in FIG. 4B continues, and results in switching from displaying the partially expanded view of the first UFI 420 (FIG. 4C) to displaying a further expanded, but still partially expanded view of the first UFI 420 (FIG. 4D). In addition to the user feedback and affordances displayed in the partially expanded view in FIG. 4C, the partially expanded view in FIG. 4D includes comment 412-2, which is a larger portion of the entire comment 412-3 than the comment 412-1 (FIG. 4A). The partially expanded view in FIG. 4D also displays user feedback of a set of users (e.g., "likes" by a set of users 402), of which users 402-2 and 402-3 are a subset (as shown in the compressed view of FIG. 4A, and the partially expanded view in FIG. 4C).

FIG. 4E illustrates a fully expanded view of the first UFI 420. Here, the continued detection (e.g., completion) of the swipe gesture 414-1 initiated in FIG. 4B results in switching from displaying a partially expanded view of the first UFI 420 (FIG. 4D) to displaying a fully expanded view of the first UFI 420 (FIG. 4E). In addition to the user feedback and affordances displayed in the partially expanded view in FIG. 4D, the fully expanded view in FIG. 4E includes the entire comment 412-3 (which resulted in creation of the first story 400-1).

Referring now to FIG. 4F, detecting the swipe gesture 414-2 results in switching from displaying a compressed view of the second UFI 430 (FIG. 4F) to displaying a partially expanded view of the second UFI 430 (FIG. 4G). As shown, the partially expanded view in FIG. 4G displays user feedback that was displayed by the compressed view in FIG. 4F (e.g., "likes" by users 404-1 and 404-2, and indicator 406-2), and also displays additional user feedback that was not displayed by the compressed view (e.g., comment 432-1, and "likes" by a set of users 404, of which users 404-1 and 404-2 are a subset). Furthermore, the partially expanded view in FIG. 4F also includes affordances that were not displayed by the compressed view (e.g., comment affordance 434-1 and "like" affordance 434-2), and additional affordances for providing feedback for displayed user feedback (e.g., "like" affordances 434-3 for "liking" the comment 432-1 for the second story 400-2).

FIG. 4H illustrates a fully expanded view of the second UFI 430. Here, continued detection (e.g., completion) of the same swipe gesture 414-2 initiated in FIG. 4F results in switching from displaying a partially expanded view of the second UFI 430 (FIG. 4G) to displaying a fully expanded view of the second UFI 430 (FIG. 4H). In addition to the user feedback and affordances displayed in the partially expanded view in FIG. 4G, the fully expanded view in FIG. 4H displays additional user feedback (e.g., comments 432-2 through 432-4).

The examples shown in FIGS. 4A-4H illustrate one order in which additional and/or alternative user feedback and affordances are displayed when switching from a compressed to a partially expanded view, or from a partially expanded to a fully expanded view (e.g., for the first UFI 420, in response to detecting the swipe gesture 414-1, "Comments" are first displayed (FIG. 4C), then additional users who "liked" the story are displayed (FIG. 4D), and then the entire comment 412-3 is displayed (FIG. 4E)). In other embodiments, user feedback and affordances may be displayed in an order distinct from the examples of FIGS. 4A-4H and may include additional and/or alternative user feedback and affordances.

FIGS. 5A-5E are flow diagrams illustrating methods 500 (FIGS. 5A-5B) and 530 (FIGS. 5C-5E) for providing user feedback, in accordance with some embodiments. The methods 500 and 530 are performed on a client device (e.g., client device 104, FIGS. 1 and 3) and may be performed in conjunction with each other (e.g., such that they together compose a single method). FIGS. 5A-5E correspond to instructions stored in a computer memory (e.g., memory 306 of the client device 104, FIG. 3) or other computer-readable storage medium. To assist with describing the methods 500 and 530, FIGS. 5A-5E will be described with reference to the exemplary GUIs illustrated in FIGS. 4A-4H.

In performing the method 500, the client device displays (502) a first story. The first story includes a second story and an indication of a previous user interaction with the second story that resulted in creation of the first story. As described above, stories include electronic content that can be presented and displayed on a device, such as text comments (e.g., news articles, blog posts, documents) and/or multimedia (e.g., digital photos, videos, audio files). In some embodiments, the previous user interaction includes (504) sharing, by a user, of the second story. For example, a user may utilize a feature on a social-networking service to republish a story to other users of the social-networking service (e.g., by selecting a share affordance 408-2 or a recommend affordance 408-1 in FIG. 4A, an article is republished and appears in the content feeds of the user's friends). In some embodiments, the previous user interaction includes (506) providing, by a user, of user feedback for the second story. For example, a user may comment on (e.g., by selecting a comment affordance 434-1 and entering text, FIG. 4G) or "like" a story (e.g., by selecting a "like" affordance 434-2, FIG. 4G). Other examples of user feedback include but are not limited to sharing and recommending. An example is shown in FIG. 4A, where the client device 104-1 displays a first story 400-1, which includes a second story 400-2 (e.g., an article titled "Doe Awarded Nobel Peace Prize") and an indication of a previous user interaction with the second story 400-2 that resulted in creation of the first story 400-1 (e.g., an interaction by a user, "Frances," who previously commented on the article with comment 412-1).

The client device concurrently displays (508) a first user-feedback interface (UFI) corresponding to the first story and a second user-feedback interface corresponding to the second story. The first UFI includes (510) one or more first affordances for providing user feedback regarding the first story (e.g., comment affordance 424-1 and "like" affordance 424-2, FIG. 4C), and the second user-feedback interface includes one or more second affordances for providing user feedback regarding the second story (e.g., recommend affordance 408-1 and share affordance 408-2, FIG. 4A). Therefore, a user is simultaneously presented with the option of providing user feedback for either the first story 400-1 by using the first UFI 420, or the second story 400-2 by using the second UFI 430 (FIG. 4A). FIGS. 4A through 4H illustrate multiple embodiments of a first UFI 420 and a second UFI 430 in compressed, partially expanded, and fully expanded views.

In some embodiments, the first UFI includes (512) an indication of a first user associated with the previous user interaction with the second story that resulted in creation of the first story. For example, as shown in FIG. 4A, the first UFI 420 provides an indication of the user associated with the comment 412-1 ("Frances," as represented by the displayed user name and icon).

In some embodiments, the first UFI includes (514) user feedback of one or more users for the first story, not including the first user. For example, the first UFI 420 (FIG. 4A) displays users who have "liked" the first story 400-1 (e.g., users 402-2 and 402-3). Optionally, the first UFI 420 also displays an indicator 406-1 that indicates the number of users (e.g., excluding those already displayed by the UFIs, such as users 402-2 and 402-3) who have "liked" the respective stories (e.g., indicator 406-1 indicates that five other users have "liked" the first story 400-1, FIG. 4A).

In some embodiments, displaying the first user-feedback interface includes (516) displaying at least a portion of user feedback for the second story. The user feedback is provided by the first user in the previous user interaction with the second story that resulted in creation of the first story. For example, as shown in FIG. 4A, the first UFI 420 displays comment 412-1 (e.g., "What an inspirational wom . . . "), which is a portion of the full comment 412-3 (FIG. 4E) provided by the user, "Frances," for the second story 400-2.

In some embodiments, displaying the second user-feedback interface includes (518) displaying user feedback of one or more users for the second story. For example, the second UFI 430 (FIG. 4A) displays users who have "liked" the second story 400-1 (e.g., users 404-1 and 404-2), and optional indicator 406-2 that indicates the number of additional users who have "liked" the story (e.g., over one thousand additional users).

Figure 5B:
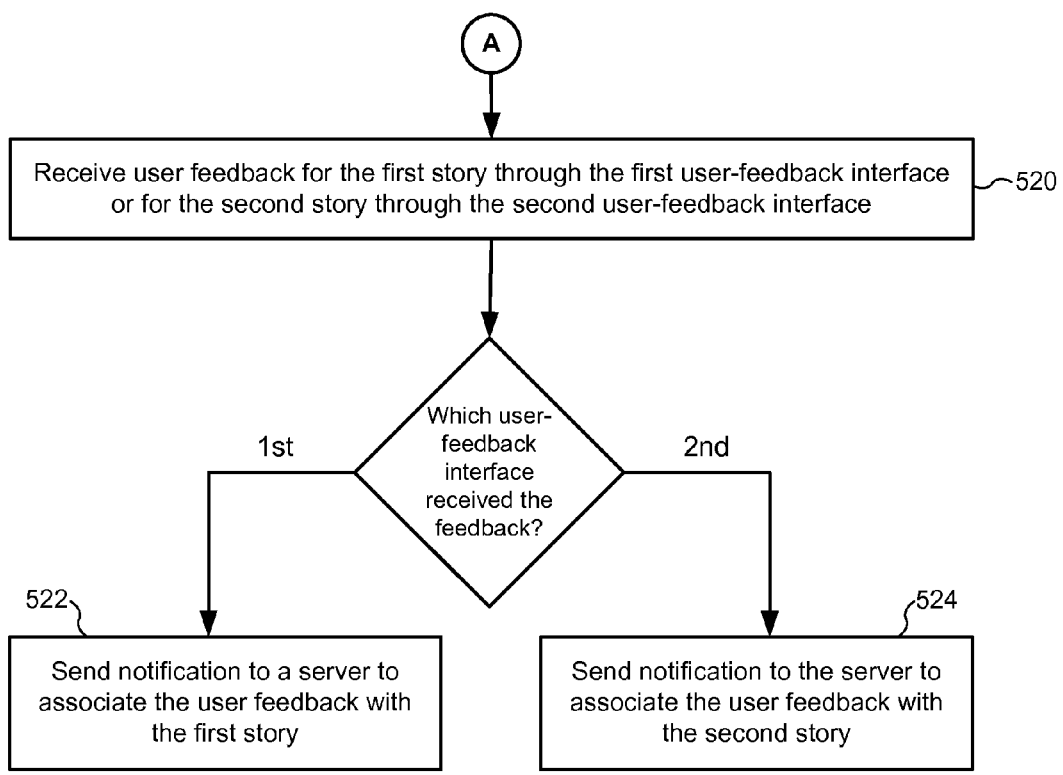
Figure 5D:
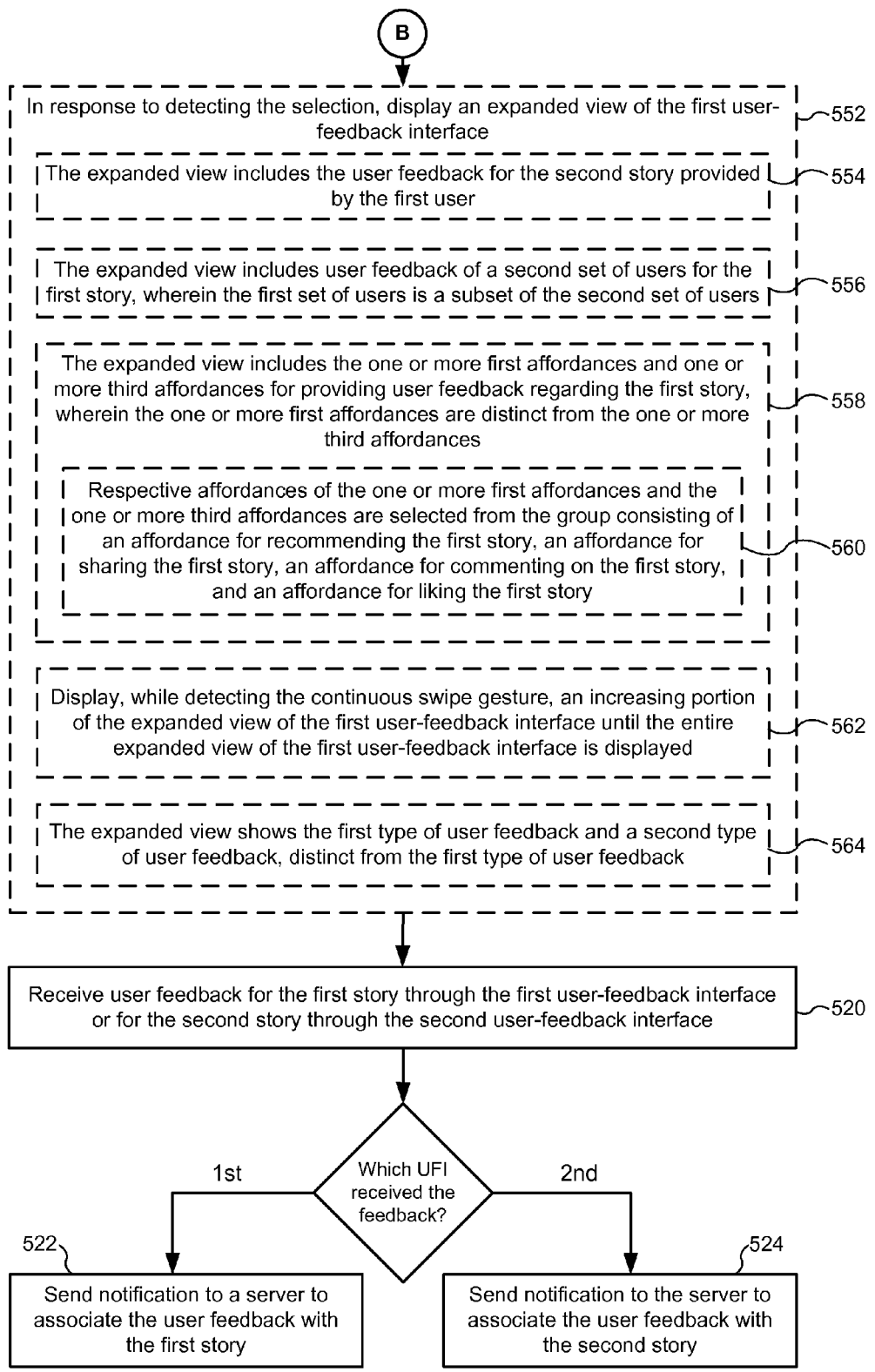
Figure 5E:
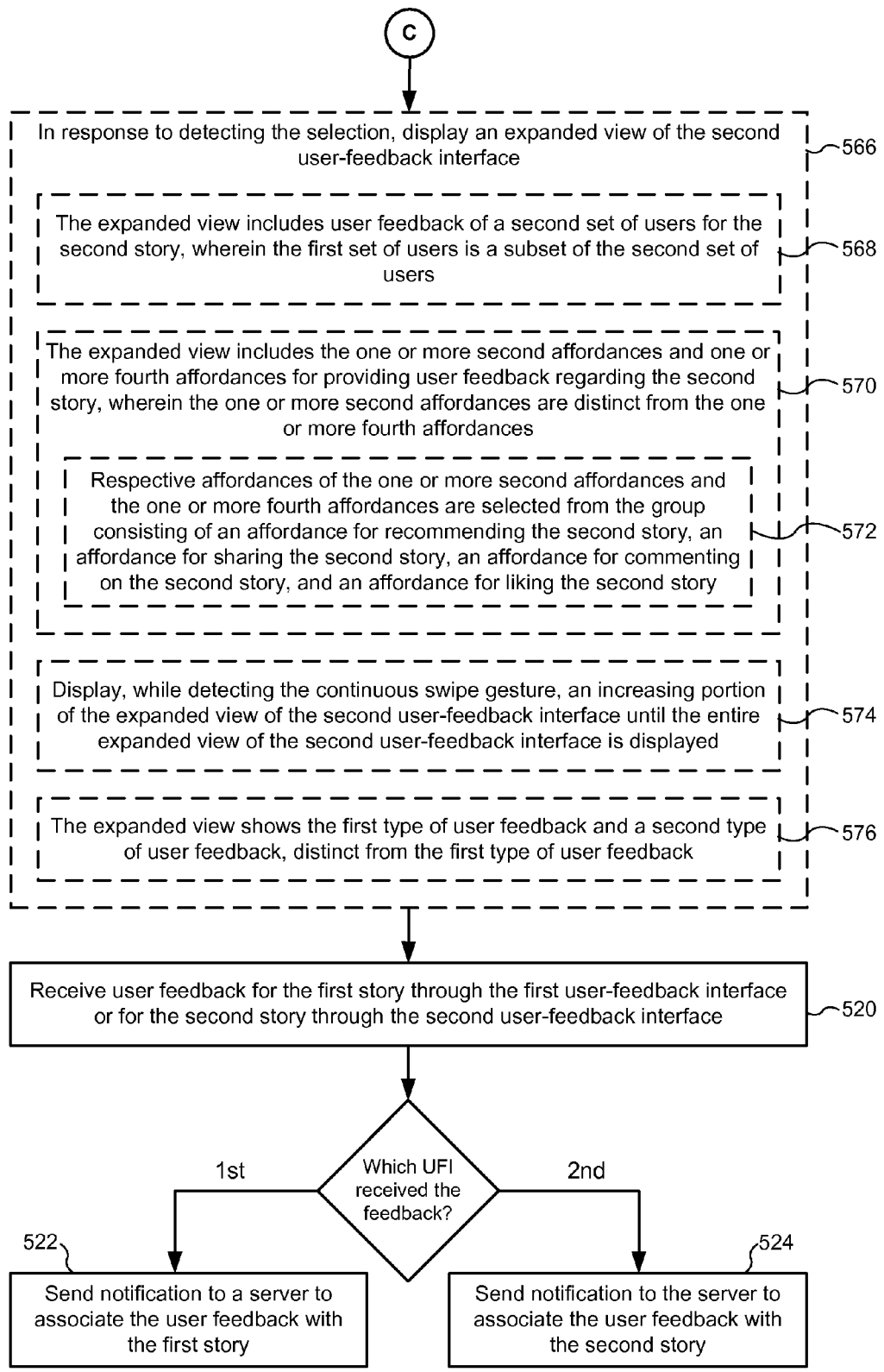

Referring now to FIG. 5B, the client device receives (520) user feedback for the first story through the first user-feedback interface or for the second story through the second user-feedback interface. When the user feedback is received through the first UFI, notification is sent (522) to a server to associate the user feedback with the first story. When the user feedback is received through the second user-feedback interface, notification is sent (524) to the server to associate the user feedback with the second story. For example, a server (e.g., social network system 108 providing a social-networking service, FIGS. 1 and 2) is provided with an indication of the UFI through which user feedback is received, along with an indication of the user feedback itself. Based on this indication, the server (e.g., social network system 108, FIG. 2) associates the user feedback with its corresponding story. Furthermore, user feedback may cause the server to create a new story that includes the corresponding story and the user feedback.

Referring now to FIG. 5C, in performing the method 530, the client device displays (502) a first story and concurrently displays (508) a first user-feedback interface (UFI) corresponding to the first story and a second user-feedback interface corresponding to the second story, as discussed above with respect to the method 500).

In some embodiments, the client device displays (532) compressed views of the first and/or second user-feedback interfaces. Examples of compressed views of a first UFI 420 and a second UFI 430 are shown in FIG. 4A.

In some embodiments, the compressed view of the first UFI includes (534) a portion of user feedback for the second story provided by a first user in the previous user interaction that resulted in creation of the first story. For example, the compressed view of the first UFI 420 (FIG. 4A) includes comment 412-1, which is a portion of the full comment 412-3 (FIG. 4E). In some embodiments, the compressed view of the first UFI includes (536) user feedback of a first set of users, not including the first user, for the first story (e.g., users 402-2 and 402-3, FIG. 4A). In some embodiments, the compressed view of the first UFI includes (538) the one or more first affordances. In some embodiments, the compressed view of the first UFI shows (540) a first type of user feedback (e.g., a comment 412-1 for the second story 400-2, "likes" by users 402-2 and 402-3, FIG. 4A).

In some embodiments, the compressed view of the second UFI includes (542) user feedback of a first set of users for the second story. In some embodiments, the first set of users who provided feedback for the second story includes at least some users distinct from the first set of users who provided (536) feedback for the first story. In some embodiments, the compressed view of the second UFI includes (544) the one or more second affordances (e.g., recommend affordance 408-1 and share affordance 408-2, FIG. 4A). In some embodiments, the compressed view of the second UFI shows (546) a first type of user feedback (e.g., "likes" by users 404-1 and 404-2, FIG. 4A).

In some embodiments, the client device detects (548) selection of the first or second user-feedback interface. For example, the client device detects (550) a continuous swipe gesture beginning on the first or second user-feedback interface (e.g., swipe gesture 414-1 beginning on the first UFI 420). In some embodiments, the continuous swipe gesture is a substantially vertical swipe (e.g., within a specified number of degrees of vertical), as shown for the swipe gesture 414-1. In some embodiments, the swipe gesture is a touch-screen input (e.g., detected by the touch-sensitive surface 314 of client device 104, FIG. 3). The swipe gesture may also be detected by other input devices (e.g., a touchpad). Alternatively and/or additionally, selection of the first or second UFI may include other touch inputs (e.g., a tap).

In some embodiments, in response to detecting the selection of the first user-feedback interface, the client device displays (552, FIG. 5D) an expanded view of the first user-feedback interface. For example, in FIG. 4B, detecting a downward swipe gesture 414-1 starting on the first UFI 420 results in switching from displaying a compressed view of the first UFI 420 (FIG. 4B) to displaying a partially expanded view of the first UFI 420 (FIGS. 4C and 4D) and then a fully expanded view of the first UFI 420 (FIG. 4E).

In some embodiments, the expanded view of the first UFI includes (554) the user feedback for the second story provided by the first user (e.g., comment 412-3 by user 402-1, FIG. 4C, of which comment 412-1 is a portion, as shown in FIG. 4A).

In some embodiments, the expanded view of the first UFI includes (556) user feedback of a second set of users for the first story, wherein the first set of users (536) is a subset of the second set of users. For example, in the partially expanded view in FIG. 4D and the fully expanded view in FIG. 4E, the set of users 402 who have "liked" the first story 400-1 includes the users 402-2 and 402-3, whose "likes" are also shown in the compressed view of the first UFI 420 in FIG. 4B. The partially expanded view of the first UFI 420 therefore displays more user feedback (e.g., more "likes") than the compressed view. In some embodiments, the second set of users is a subset of a third set of users (e.g., third set includes all users who have "liked" or provided feedback for a respective story).

In some embodiments, the expanded view of the first UFI includes (558) the one or more first affordances (510, FIG. 5A) and one or more third affordances for providing user feedback regarding the first story, wherein the one or more first affordances are distinct from the one or more third affordances. In some embodiments, respective affordances of the one or more first affordances and the one or more third affordances are selected (560) from the group consisting of an affordance for recommending the first story, an affordance for sharing the first story, an affordance for commenting on the first story (e.g., 424-1, FIG. 4C), and an affordance for "liking" the first story (e.g., 424-2, FIG. 4C). For example, the compressed view of the first UFI 420 may include a share affordance (not shown in FIG. 4A-4H), while a partially or fully expanded view (FIGS. 4C-4E) includes a comment affordance 424-1 and a "like" affordance 424-2 that are not included in the compressed view.

In some embodiments, the client device displays (562), while detecting the continuous swipe gesture, an increasing portion of the expanded view of the first user-feedback interface until the entire expanded view of the first user-feedback interface is displayed. An example is shown in FIGS. 4B-4E, where a continuous swipe gesture 414-1 is first detected (FIG. 4B), and the partially expanded view of the first UFI 420 increases (FIGS. 4C through 4D) with the continued detection of the swipe gesture 414-1 until the fully expanded view of the first UFI 420 is displayed (FIG. 4E). In some embodiments, the amount of user feedback, the number of affordances, and/or the number of additional elements displayed in an expanded view of the first UFI increases with (e.g., is proportional to) the magnitude of the swipe gesture (e.g., total screen distance traversed by the swipe gesture). The amount of user feedback shown thus may be a function of how much of the expanded view has been dragged into view by the user. The expanded view is therefore populated with more and/or additional types of user feedback the longer the swipe gesture is dragged out, until the full expanded view is shown or the swipe gesture ends. For example, the partially expanded view in FIG. 4D displays more user feedback (e.g., more users who have "liked" the first story 400-1) than the partially expanded view in FIG. 4C because the magnitude of the swipe gesture 414-1 (as measured relative to the first detection in FIG. 4B) is greater in FIG. 4D than in FIG. 4C.

In some embodiments, the expanded view of the first UFI shows (564) the first type of user feedback (540) and a second type of user feedback, distinct from the first type of user feedback. For example, a compressed view of the first UFI may display user "likes" of a first story (a first type of user feedback), while a partially or fully expanded view of the first UFI displays both user "likes" and user comments for the first story (a second type of user feedback).

The client device receives (520) user feedback for the first story through the first user-feedback interface or for the second story through the second user-feedback interface. When the user feedback is received through the first UFI, notification is sent (522) to a server to associate the user feedback with the first story. When the user feedback is received through the second user-feedback interface, notification is sent (524) to the server to associate the user feedback with the second story. Receiving user feedback (520) and sending notifications to the server (522 and 524) are performed in accordance with any of the embodiments discussed above with respect to the method 500.

In some embodiments, in response to detecting (548, FIG. 5C) the selection on the second user-feedback interface, the client device displays (566, FIG. 5E) an expanded view of the second user-feedback interface. For example, in FIG. 4F, detecting an upward swipe gesture 414-2 starting on the second UFI 430 results in switching from displaying a compressed view of the second UFI 430 (FIG. 4F) to displaying a partially expanded view of the second UFI 430 (FIG. 4G) and then a fully expanded view of the second UFI 430 (FIG. 4H).

In some embodiments, the expanded view of the second UFI includes (568) user feedback of a second set of users for the second story, wherein the first set of users (542) is a subset of the second set of users. For example, in the partially expanded view in FIG. 4G and the fully expanded view in FIG. 4H, the set of users 404 who have "liked" the second story 400-1 includes the users 404-1 and 404-2, whose "likes" are also shown in the compressed view of the second UFI 430 in FIG. 4F. In some embodiments, the second set of users is a subset of a third set of users (e.g., third set includes all users who have "liked" or provided feedback for a respective story).

In some embodiments, the expanded view of the second UFI includes (570) the one or more second affordances (510, FIG. 5A) and one or more fourth affordances for providing user feedback regarding the second story, wherein the one or more second affordances are distinct from the one or more fourth affordances. In some embodiments, respective affordances of the one or more second affordances and the one or more fourth affordances are selected (572) from the group consisting of an affordance for recommending the second story (e.g., 408-1, FIG. 4A), an affordance for sharing the second story (e.g., 408-2, FIG. 4A), an affordance for commenting on the second story (e.g., 434-1, FIG. 4G), and an affordance for "liking" the second story (e.g., 434-2, FIG. 4G). For example, the compressed view of the second UFI 430 (FIG. 4A) includes a recommend affordance 408-1 and a share affordance 408-2, while a partially or fully expanded view (FIGS. 4G-4H) includes a comment affordance 434-1 and a "like" affordance 434-2 that are not included in the compressed view.

In some embodiments, the client device displays (574), while detecting the continuous swipe gesture, an increasing portion of the expanded view of the second user-feedback interface until the entire expanded view of the second user-feedback interface is displayed. An example is shown in FIGS. 4F-4H, where a continuous swipe gesture 414-2 is first detected (FIG. 4F), and the partially expanded view of the second UFI 420 increases (FIGS. 4G) with the continued detection of the swipe gesture 414-2 until the fully expanded view of the second UFI 430 is displayed (FIG. 4H). In some embodiments, the amount of user feedback, the number of affordances, and/or the number of additional elements displayed in an expanded view of the second UFI increases with (e.g., is proportional to) the magnitude of the swipe gesture (e.g., total screen distance traversed since the first detection of the swipe gesture).

In some embodiments, the expanded view of the second UFI shows (576) the first type (546) of user feedback (e.g., user "likes") and a second type of user feedback (e.g., user comments), distinct from the first type of user feedback.

The client device receives (520) user feedback for the first story through the first user-feedback interface or for the second story through the second user-feedback interface. When the user feedback is received through the first UFI, notification is sent (522) to a server to associate the user feedback with the first story. When the user feedback is received through the second user-feedback interface, notification is sent (524) to the server to associate the user feedback with the second story. Receiving user feedback (520) and sending notifications to the server (522 and 524) are performed in accordance with any of the embodiments discussed above with respect to the method 500.

For situations in which the systems discussed above collect information about users, the users may be provided with an opportunity to opt in/out of programs or features that may collect personal information (e.g., information about a user's preferences or a user's contributions to social content providers). In addition, in some embodiments, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
    at a client device having one or more processors and memory storing instructions for execution by the one or more processors:
        displaying a first story, wherein the first story comprises a republication of a second story and an indication of a previous user interaction with the second story that resulted in creation of the first story;
        concurrently with displaying the first story, displaying a compressed view of a first user-feedback interface corresponding to the first story and a compressed view of a second user-feedback interface corresponding to the second story, wherein
            the first user-feedback interface comprises one or more first affordances for providing user feedback regarding the first story;
            the second user-feedback interface comprises one or more second affordances for providing user feedback regarding the second story; and
            displaying the compressed view of the second user-feedback interface comprises displaying the one or more second affordances;
        receiving user feedback for the first story through the first user-feedback interface or for the second story through the second user-feedback interface;
        when the user feedback is received through the first user-feedback interface, sending notification to a server to associate the user feedback with the first story;
        when the user feedback is received through the second user-feedback interface, sending notification to the server to associate the user feedback with the second story;
        detecting user selection of the first user-feedback interface or the second user-feedback interface;
        when user selection of the first user-feedback interface is detected, displaying an expanded view of the first user-feedback interface concurrently with displaying the compressed view of the second user-feedback interface, the expanded view of the first user-feedback interface including the one or more first affordances and replacing at least a portion of the second story; and
        when user selection of the second user-feedback interface is detected, displaying an expanded view of the second user-feedback interface concurrently with displaying the compressed view of the first user-feedback interface, the expanded view of the second user-feedback interface including the one or more second affordances and replacing at least a portion of the second story.

2. The method of claim 1, wherein the first user-feedback interface further comprises:
    an indication of a first user associated with the previous user interaction with the second story that resulted in creation of the first story, and
    user feedback of one or more users, not including the first user, for the first story.

3. The method of claim 1, wherein the previous user interaction comprises sharing, by a first user, of the second story.

4. The method of claim 1, wherein the previous user interaction comprises providing, by a first user, of user feedback for the second story.

5. The method of claim 4, wherein displaying the first user-feedback interface comprises displaying at least a portion of the user feedback for the second story provided by the first user in the previous user interaction with the second story that resulted in creation of the first story.

6. The method of claim 1, wherein:
    the compressed view of the first user-feedback interface comprises:
        a portion of user feedback for the second story provided by a first user in the previous user interaction that resulted in creation of the first story, and
        indication of user feedback of a first set of users, not including the first user, for the first story; and
    the expanded view of the first user-feedback interface comprises:
        the user feedback for the second story provided by the first user; and
        user feedback of a second set of users for the first story, wherein the second set of users is a subset of the first set of users.

7. The method of claim 1, wherein:
    the compressed view of the first user-feedback interface comprises the one or more first affordances; and
    the expanded view of the first user-feedback interface comprises the one or more first affordances and one or more third affordances for providing user feedback regarding the first story, wherein the one or more first affordances are distinct from the one or more third affordances.

8. The method of claim 7, wherein respective affordances of the one or more first affordances and the one or more third affordances are selected from the group consisting of an affordance for recommending the first story, an affordance for sharing the first story, an affordance for commenting on the first story, and an affordance for liking the first story.

9. The method of claim 1, wherein:
    detecting the selection comprises detecting a continuous swipe gesture beginning on the first user-feedback interface; and
    displaying the expanded view of the first user-feedback interface comprises displaying, while detecting the continuous swipe gesture, an increasing portion of the expanded view of the first user-feedback interface until the entire expanded view of the first user-feedback interface is displayed.

10. The method of claim 1, wherein:
    the compressed view of the first user-feedback interface shows a first type of user feedback; and
    the expanded view of the first user-feedback interface shows the first type of user feedback and a second type of user feedback, distinct from the first type of user feedback.

11. The method of claim 1, wherein displaying the second user-feedback interface comprises displaying user feedback of one or more users for the second story.

12. The method of claim 1, wherein:
the compressed view of the second user-feedback interface comprises user feedback of a first set of users for the second story; and
the expanded view of the second user-feedback interface comprises user feedback of a second set of users for the second story, wherein the first set of users is a subset of the second set of users.

13. The method of claim 12, wherein:
the compressed view of the second user-feedback interface shows a first type of user feedback; and
the expanded view of the second user-feedback interfaces shows the first type of user feedback and a second type of user feedback, distinct from the first type of user feedback.

14. The method of claim 1, wherein:
the compressed view of the second user-feedback interface comprises the one or more second affordances; and
the expanded view of the second user-feedback interface comprises the one or more second affordances and one or more fourth affordances for providing user feedback regarding the second story, wherein the one or more second affordances are distinct from the one or more fourth affordances.

15. The method of claim 14, wherein respective affordances of the one or more second affordances and the one or more fourth affordances are selected from the group consisting of an affordance for recommending the second story, an affordance for sharing the second story, an affordance for commenting on the second story, and an affordance for liking the second story.

16. The method of claim 1, wherein:
detecting the selection comprises detecting a continuous swipe gesture beginning on the second user-feedback interface; and
displaying the expanded view of the second user-feedback interface comprises displaying, while detecting the continuous swipe gesture, an increasing portion of the expanded view of the second user-feedback interface until the entire expanded view of the second user-feedback interface is displayed.

17. A client device, comprising:
one or more processors; and
memory for storing one or more programs for execution by the one or more processors, the one or more programs including instructions for:
displaying a first story, wherein the first story comprises a republication of a second story and an indication of a previous user interaction with the second story that resulted in creation of the first story;
concurrently with displaying the first story, displaying a compressed view of a first user-feedback interface corresponding to the first story and a compressed view of a second user-feedback interface corresponding to the second story, wherein
the first user-feedback interface comprises one or more first affordances for providing user feedback regarding the first story;
the second user-feedback interface comprises one or more second affordances for providing user feedback regarding the second story; and
displaying the compressed view of the second user-feedback interface comprises displaying the one or more second affordances;
receiving user feedback for the first story through the first user-feedback interface or for the second story through the second user-feedback interface;
when the user feedback is received through the first user-feedback interface, sending notification to a server to associate the user feedback with the first story;
when the user feedback is received through the second user-feedback interface, sending notification to the server to associate the user feedback with the second story;
detecting user selection of the first user-feedback interface or the second user-feedback interface;
in response to detecting user selection of the first user-feedback interface, displaying an expanded view of the first user-feedback interface concurrently with displaying the compressed view of the second user-feedback interface, the expanded view of the first user-feedback interface including the one or more first affordances and replacing at least a portion of the second story; and
in response to detecting the selection of the second user-feedback interface, displaying an expanded view of the second user-feedback interface concurrently with displaying the compressed view of the first user-feedback interface, the expanded view of the second user-feedback interface including the one or more second affordances and replacing at least a portion of the second story.

18. A non-transitory computer-readable storage medium storing one or more programs for execution by one or more processors of a client device, the one or more programs including instructions for:
displaying a first story, wherein the first story comprises a republication of a second story and an indication of a previous user interaction with the second story that resulted in creation of the first story;
concurrently with displaying the first story, displaying a compressed view of a first user-feedback interface corresponding to the first story and a compressed view of a second user-feedback interface corresponding to the second story, wherein
the first user-feedback interface comprises one or more first affordances for providing user feedback regarding the first story;
the second user-feedback interface comprises one or more second affordances for providing user feedback regarding the second story; and
displaying the compressed view of the second user-feedback interface comprises displaying the one or more second affordances;
receiving user feedback for the first story through the first user-feedback interface or for the second story through the second user-feedback interface;
when the user feedback is received through the first user-feedback interface, sending notification to a server to associate the user feedback with the first story;
when the user feedback is received through the second user-feedback interface, sending notification to the server to associate the user feedback with the second story;
detecting user selection of the first user-feedback interface or the second user-feedback interface;
in response to detecting user selection of the first user-feedback interface, displaying an expanded view of the first user-feedback interface concurrently with displaying the compressed view of the second user-feedback interface, the expanded view of the first user-feedback interface including the one or more first affordances and replacing at least a portion of the second story; and in response to detecting the selection of the second user-feedback interface, displaying an expanded view of the second user-feedback interface concurrently with displaying the compressed view of the first user-feedback interface, the expanded view of the second user-feedback interface including the one or more second affordances and replacing at least a portion of the second story.

19. The computer-readable storage medium of claim 18, wherein the one or more second affordances include recommend and share affordances that are not included in the one or more first affordances.

\* \* \* \* \*